US 8,475,510 B2

(12) United States Patent
Simon et al.

(10) Patent No.: US 8,475,510 B2
(45) Date of Patent: Jul. 2, 2013

(54) AIRFLOW APPLICATORS AND RELATED TREATMENT METHODS

(75) Inventors: Eric M. Simon, Salt Lake City, UT (US); Randall D. Block, Salt Lake City, UT (US)

(73) Assignee: Larada Sciences, Inc., Salt Lake City, UT (US)

( * ) Notice: Subject to any disclaimer, the term of this patent is extended or adjusted under 35 U.S.C. 154(b) by 532 days.

(21) Appl. No.: 12/565,616

(22) Filed: Sep. 23, 2009

(65) Prior Publication Data

US 2010/0071713 A1 Mar. 25, 2010

Related U.S. Application Data

(60) Provisional application No. 61/099,486, filed on Sep. 23, 2008.

(51) Int. Cl.
*A61F 7/00* (2006.01)
*A45D 24/22* (2006.01)

(52) U.S. Cl.
USPC ........... 607/107; 607/104; 132/113; 132/114; 132/115

(58) Field of Classification Search
USPC ................... 135/113–115; 15/339; 607/104, 607/107
See application file for complete search history.

(56) References Cited

U.S. PATENT DOCUMENTS

| | | | |
|---|---|---|---|
| 3,721,250 A | 3/1973 | Walter et al. | |
| 3,903,905 A | 9/1975 | Tucker | |
| 3,955,065 A | 5/1976 | Chambon | |
| 3,986,272 A | 10/1976 | Feierabent | |
| 4,003,388 A | 1/1977 | Nopanen | |
| 4,050,469 A | 9/1977 | Lin | |
| 4,085,309 A | 4/1978 | Godel et al. | |
| 4,114,022 A | 9/1978 | Braulke, III | |
| 4,295,283 A | 10/1981 | Tomaro | |
| 4,327,278 A | 4/1982 | Tomaro | |
| 4,376,441 A | 3/1983 | Duncan | |

(Continued)

FOREIGN PATENT DOCUMENTS

| | | |
|---|---|---|
| EP | 0 689 783 A1 | 6/1995 |
| EP | 0 693 262 B1 | 7/1995 |

(Continued)

OTHER PUBLICATIONS

Hiraoka, Tauyoshi et al., "Thermotolerance of human body louse, *Pediculus humanus corporis*, 1: Treatment of adults and eggs by hot water", Jpn. J. Sanit. Zool., 1995, pp. 77-79, vol. 46, No. 1.

(Continued)

*Primary Examiner* — Linda Dvorak
*Assistant Examiner* — Kaitlyn Smith
(74) *Attorney, Agent, or Firm* — Phillips Ryther & Winchester; Matthew D. Thayne

(57) ABSTRACT

Disclosed are embodiments of airflow applicators used for delivering directional, heated air to, for example, the scalp and hair of humans and/or animals to eliminate ectoparasites, such as lice and lice eggs. In preferred embodiments, the applicators are configured to deliver heated airflow (from a separate device, or from another portion of a single device, that generates heated airflow) efficiently right to where ectoparasites and their eggs most frequently reside. Also disclosed are treatment methods, including preferred treatment patterns, for delivering heated airflows for use in eliminating ectoparasites and their eggs on an animal.

20 Claims, 10 Drawing Sheets

U.S. PATENT DOCUMENTS

| | | | |
|---|---|---|---|
| 4,380,790 A | 4/1983 | Saferstein et al. | |
| 4,557,247 A | 12/1985 | Hara et al. | |
| 4,572,188 A | 2/1986 | Augustine et al. | |
| 4,671,303 A | 6/1987 | Saferstein et al. | |
| 4,676,260 A | 6/1987 | Paulhus et al. | |
| 4,683,370 A | 7/1987 | Petersen et al. | |
| 4,692,594 A | 9/1987 | Martin | |
| 4,759,135 A | 7/1988 | Scivoletto | |
| 4,815,232 A | 3/1989 | Rawski | |
| 4,819,670 A | 4/1989 | Saferstein et al. | |
| 4,848,007 A | 7/1989 | Montagnino | |
| 4,904,847 A | 2/1990 | Kosaka et al. | |
| D307,192 S | 4/1990 | Saferstein et al. | |
| 4,927,813 A | 5/1990 | Bernstein | |
| 4,955,145 A | 9/1990 | Scivoletto | |
| 4,961,283 A | 10/1990 | Forbes | |
| 5,067,444 A | 11/1991 | Parker | |
| 5,072,746 A | 12/1991 | Kantor | |
| 5,078,157 A | 1/1992 | Golan et al. | |
| 5,112,515 A | 5/1992 | Buxton et al. | |
| 5,157,757 A | 10/1992 | McDougall | |
| 5,178,168 A | 1/1993 | Kantor | |
| 5,195,253 A | 3/1993 | Poumey et al. | |
| 5,235,759 A | 8/1993 | Rizzuto, Jr. | |
| 5,261,427 A * | 11/1993 | Dolev | 132/200 |
| 5,275,339 A | 1/1994 | Andis et al. | |
| 5,287,635 A | 2/1994 | Chan | |
| 5,288,483 A | 2/1994 | Cardin et al. | |
| 5,292,504 A | 3/1994 | Cardin et al. | |
| 5,300,098 A | 4/1994 | Philipot | |
| 5,300,101 A | 4/1994 | Augustine et al. | |
| 5,300,102 A | 4/1994 | Augustine et al. | |
| 5,303,483 A | 4/1994 | Chan | |
| D349,585 S | 8/1994 | Rizzuto, Jr. | |
| 5,343,881 A | 9/1994 | Golan et al. | |
| 5,350,417 A | 9/1994 | Augustine | |
| D354,152 S | 1/1995 | Mathews | |
| 5,434,946 A | 7/1995 | Barilai et al. | |
| D365,662 S | 12/1995 | Leman | |
| 5,486,205 A | 1/1996 | Cornell et al. | |
| 5,488,783 A | 2/1996 | Parkinson et al. | |
| D368,342 S | 3/1996 | Founds | |
| D369,229 S | 4/1996 | Oberheim | |
| 5,526,578 A | 6/1996 | Iyer | |
| 5,554,360 A | 9/1996 | Nakamura et al. | |
| 5,621,980 A | 4/1997 | Kingsbury | |
| 5,628,332 A | 5/1997 | Debourg et al. | |
| 5,636,646 A * | 6/1997 | Zito | 132/149 |
| 5,649,502 A | 7/1997 | Frank | |
| 5,658,750 A | 8/1997 | Sheftel et al. | |
| D384,772 S | 10/1997 | Kling | |
| 5,674,269 A | 10/1997 | Augustine | |
| D392,413 S | 3/1998 | Gudefin | |
| 5,727,331 A | 3/1998 | Thaler et al. | |
| 5,733,320 A | 3/1998 | Augustine | |
| 5,765,292 A | 6/1998 | Chan | |
| 5,768,749 A | 6/1998 | Ohi et al. | |
| 5,783,202 A | 7/1998 | Tomlinson et al. | |
| 5,785,723 A | 7/1998 | Beran et al. | |
| 5,858,383 A | 1/1999 | Precopio | |
| 5,875,282 A | 2/1999 | Jordan et al. | |
| 5,876,428 A | 3/1999 | Van Duren | |
| 5,918,607 A | 7/1999 | Zucker | |
| 5,937,139 A | 8/1999 | Peterson | |
| 5,953,829 A | 9/1999 | Van Den Brug et al. | |
| D414,896 S | 10/1999 | Goetschi | |
| 5,968,084 A | 10/1999 | Augustine et al. | |
| 5,968,507 A | 10/1999 | Upton | |
| 5,972,987 A | 10/1999 | Reid et al. | |
| 5,977,186 A | 11/1999 | Franklin | |
| 5,997,846 A | 12/1999 | Burns et al. | |
| 5,997,847 A | 12/1999 | Spiesel | |
| 6,006,758 A | 12/1999 | Thorne | |
| 6,053,180 A | 4/2000 | Kwan | |
| 6,063,771 A | 5/2000 | Snyder | |
| 6,086,682 A | 7/2000 | Anderson | |
| D433,182 S | 10/2000 | Kwong | |
| 6,126,681 A | 10/2000 | Van Duren et al. | |
| 6,130,253 A | 10/2000 | Franklin et al. | |
| 6,139,859 A | 10/2000 | Precopio | |
| 6,141,901 A | 11/2000 | Johnson et al. | |
| 6,143,020 A | 11/2000 | Shigezawa et al. | |
| 6,146,411 A | 11/2000 | Noda et al. | |
| 6,146,412 A | 11/2000 | Van Duren | |
| 6,158,443 A | 12/2000 | Leman et al. | |
| 6,169,850 B1 | 1/2001 | Menassa | |
| D441,136 S | 4/2001 | Leman | |
| 6,254,337 B1 | 7/2001 | Arnold | |
| 6,262,031 B1 | 7/2001 | Larouche et al. | |
| 6,265,384 B1 | 7/2001 | Pearlman | |
| 6,266,893 B1 | 7/2001 | Standley | |
| 6,269,549 B1 | 8/2001 | Carlucci et al. | |
| 6,303,581 B2 | 10/2001 | Pearlman | |
| 6,342,253 B1 | 1/2002 | Whitledge | |
| 6,342,482 B1 | 1/2002 | Snyder | |
| 6,350,724 B1 | 2/2002 | Kiel et al. | |
| 6,350,734 B1 | 2/2002 | Pearlman | |
| 6,355,915 B1 | 3/2002 | Ziaimehr et al. | |
| 6,357,491 B1 | 3/2002 | Buchanan et al. | |
| 6,386,845 B1 | 5/2002 | Bedard | |
| 6,408,533 B2 | 6/2002 | Sakamoto | |
| 6,425,403 B1 | 7/2002 | Lin Lu et al. | |
| D462,141 S | 8/2002 | Carlucci et al. | |
| 6,440,157 B1 | 8/2002 | Shigezawa et al. | |
| 6,440,388 B1 | 8/2002 | Burns et al. | |
| 6,485,734 B1 | 11/2002 | Baker et al. | |
| 6,524,604 B1 | 2/2003 | Ozelkan et al. | |
| 6,541,455 B2 | 4/2003 | Pearlman | |
| 6,541,740 B2 | 4/2003 | Ziaimehr et al. | |
| 6,565,665 B2 | 5/2003 | Altschuler | |
| 6,572,333 B2 | 6/2003 | Fujinaka | |
| D477,112 S | 7/2003 | Yeung | |
| 6,588,140 B1 | 7/2003 | Johnson et al. | |
| 6,596,291 B2 | 7/2003 | Bell | |
| 6,607,716 B1 | 8/2003 | Smith et al. | |
| 6,637,440 B2 * | 10/2003 | de Laforcade | 132/112 |
| 6,663,860 B1 | 12/2003 | Tvedten | |
| 6,663,876 B2 | 12/2003 | Campbell et al. | |
| 6,678,994 B2 | 1/2004 | Topp | |
| 6,685,969 B2 | 2/2004 | Van Scoik et al. | |
| 6,689,079 B2 | 2/2004 | Flick et al. | |
| 6,689,394 B2 | 2/2004 | Van Scoik et al. | |
| 6,691,713 B1 | 2/2004 | Altschuler | |
| D487,945 S | 3/2004 | Anthony et al. | |
| 6,701,552 B2 | 3/2004 | Suzuki et al. | |
| 6,727,228 B2 | 4/2004 | Janssen et al. | |
| D490,185 S | 5/2004 | Hegner et al. | |
| 6,745,996 B1 | 6/2004 | Guthrie | |
| D493,571 S | 7/2004 | Jenkins | |
| 6,793,931 B2 | 9/2004 | Precopio | |
| 6,827,729 B2 | 12/2004 | Gammons et al. | |
| 6,876,884 B2 | 4/2005 | Hansen et al. | |
| 6,936,269 B2 | 8/2005 | Robinson | |
| 6,974,584 B2 | 12/2005 | Bessette | |
| 7,030,095 B2 | 4/2006 | Janssen et al. | |
| 7,037,068 B2 | 5/2006 | Cobb et al. | |
| 7,040,037 B2 | 5/2006 | Keong | |
| 7,047,660 B2 | 5/2006 | Leventhal | |
| 7,064,108 B2 | 6/2006 | Guzzo et al. | |
| D524,983 S | 7/2006 | Smith et al. | |
| 7,089,945 B1 | 8/2006 | Barge | |
| 7,090,833 B2 | 8/2006 | Coleman | |
| 7,178,261 B2 | 2/2007 | McCambridge et al. | |
| 7,220,273 B2 | 5/2007 | Van Duren et al. | |
| 7,264,004 B2 | 9/2007 | Djulbegovic | |
| 7,282,211 B2 | 10/2007 | Ping | |
| 7,294,342 B2 | 11/2007 | Precopio | |
| 7,357,939 B2 | 4/2008 | Bessette | |
| 7,361,366 B2 | 4/2008 | Bessette | |
| 7,389,779 B2 | 6/2008 | Chan | |
| 7,393,528 B2 | 7/2008 | Tvedten | |
| 7,412,781 B2 | 8/2008 | Mattinger et al. | |
| 8,118,036 B2 * | 2/2012 | Wang et al. | 132/113 |
| 2004/0126403 A1 | 7/2004 | Van Scoik et al. | |
| 2004/0126435 A1 | 7/2004 | Van Scoik et al. | |
| 2005/0013727 A1 | 1/2005 | Hedman | |
| 2005/0051190 A1 | 3/2005 | Bachrach et al. | |

| | | | | |
|---|---|---|---|---|
| 2005/0261740 A1* | 11/2005 | Clayton et al. ............... 607/1 |
| 2006/0130393 A1 | 6/2006 | Clayton et al. |
| 2007/0068544 A1* | 3/2007 | Hackl et al. ............... 132/113 |
| 2008/0214657 A1 | 9/2008 | Spring et al. |
| 2010/0049285 A1* | 2/2010 | Clayton et al. ............ 607/104 |
| 2010/0049286 A1* | 2/2010 | Thorsen ................... 607/107 |
| 2010/0071713 A1* | 3/2010 | Simon et al. ............... 132/115 |
| 2010/0145417 A1* | 6/2010 | Kaufmann et al. ......... 607/91 |
| 2010/0331931 A1* | 12/2010 | Clayton et al. ............ 607/104 |

FOREIGN PATENT DOCUMENTS

| | | |
|---|---|---|
| EP | 1 036 522 A2 | 9/2000 |
| WO | WO 90/10432 | 9/1990 |
| WO | WO 91/05561 | 5/1991 |
| WO | WO 91/15953 | 10/1991 |
| WO | WO 91/16032 | 10/1991 |
| WO | WO 94/16665 | 8/1994 |
| WO | WO 98/30124 | 1/1998 |
| WO | WO 99/35498 | 7/1999 |
| WO | WO 99/52410 | 10/1999 |
| WO | WO 99/66790 | 12/1999 |
| WO | WO 00/00213 | 1/2000 |
| WO | WO 00/19857 | 4/2000 |
| WO | WO 00/42982 | 7/2000 |
| WO | WO 00/54816 | 9/2000 |
| WO | WO 00/62613 | 10/2000 |
| WO | WO 00/72814 | 12/2000 |
| WO | WO 01/52689 A1 | 7/2001 |
| WO | WO 01/78750 | 10/2001 |
| WO | WO 02/089584 | 11/2002 |
| WO | WO 03/045145 | 6/2003 |
| WO | WO 03/056972 | 7/2003 |
| WO | WO 03/057231 | 7/2003 |
| WO | WO 03/066009 | 8/2003 |
| WO | WO 03/092583 | 11/2003 |
| WO | WO 2005/007188 | 1/2005 |
| WO | WO 2005/079563 | 9/2005 |
| WO | WO 2005/107453 | 11/2005 |
| WO | WO 2005/113060 A2 | 12/2005 |
| WO | WO 2006/017263 | 2/2006 |
| WO | WO 2006/026806 | 3/2006 |
| WO | WO 2006/071248 | 7/2006 |
| WO | WO 2006/125160 | 11/2006 |
| WO | WO 2006/137141 | 12/2006 |
| WO | WO 2007/056813 | 5/2007 |
| WO | WO 2007/104345 | 9/2007 |
| WO | WO 2008/007055 | 1/2008 |
| WO | WO 2008/022386 | 2/2008 |
| WO | WO 2008/022387 | 2/2008 |
| WO | WO 2008/038108 | 4/2008 |
| WO | WO 2008/067054 | 6/2008 |
| WO | WO 2008/087148 | 7/2008 |
| WO | WO 2008/122837 | 10/2008 |

OTHER PUBLICATIONS

Kobayashi, Mutsuo et al., "Thermotolerance of human body louse, *Pediculus humanus corporis*, 2: Preliminary evaluation of hot air for killing adults and eggs", Jpn. J. Sanit. Zool., 1995, pp. 83-86, vol. 46, No. 1.

Pearlman, Dale Lawrence, MD, A Simple Treatment for Head Lice: Dry on, Suffocation-Based Pediculicide, Pediatrics, Sep. 3, 2004, vol. 114, No. 3.

International Search Report and Written Opinion mailed Nov. 17, 2009 in PCT Application No. PCT/US09/058092, filed Sep. 23, 2009.

International Preliminary Report on Patentability mailed Nov. 20, 2007 in PCT Application No. PCT/US06/19466, filed May 18, 2006.

International Preliminary Report on Patentability mailed Nov. 21, 2006 in PCT Application No. PCT/US05/17969, filed May 19, 2005.

International Search Report and Written Opinion mailed Mar. 30, 2006 in PCT Application No. PCT/US05/17969, filed May 19, 2005.

International Search Report and Written Opinion mailed Jul. 20, 2007 in PCT Application No. PCT/US06/19466, filed May 18, 2006.

Office Action mailed Nov. 24, 2008 in U.S. Appl. No. 11/286,155, filed Nov. 23, 2005.

Office Action mailed Jul. 17, 2009 in U.S. Appl. No. 11/286,155, filed Nov. 23, 2005.

Office Action mailed Jun. 1, 2007 in U.S. Appl. No. 11/133,067, filed May 18, 2005.

Office Action mailed Nov. 23, 2007 in U.S. Appl. No. 11/133,067, filed May 18, 2005.

Office Action mailed Feb. 26, 2009 in U.S. Appl. No. 11/133,067, filed May 18, 2005.

Notice of Allowance mailed May 7, 2010 in U.S. Appl. No. 11/286,155, filed Nov. 23, 2005.

Supplementary European Search Report dated Mar. 29, 2010 in European Application No. 06770668.9.

* cited by examiner

AIRFLOW APPLICATORS AND RELATED TREATMENT METHODS

RELATED APPLICATIONS

This application claims the benefit under 35 U.S.C. §119(e) of U.S. Provisional Patent Application No. 61/099,486, filed Sep. 23, 2008, and titled "Airflow Applicator," which is incorporated herein by specific reference in its entirety.

BRIEF DESCRIPTION OF THE DRAWINGS

Understanding that drawings depict only certain preferred embodiments and are not therefore to be considered to be limiting in nature, the preferred embodiments will be described and explained with additional specificity and detail through the use of the accompanying drawings in which.

DETAILED DESCRIPTION OF PREFERRED EMBODIMENTS

Figure 1:
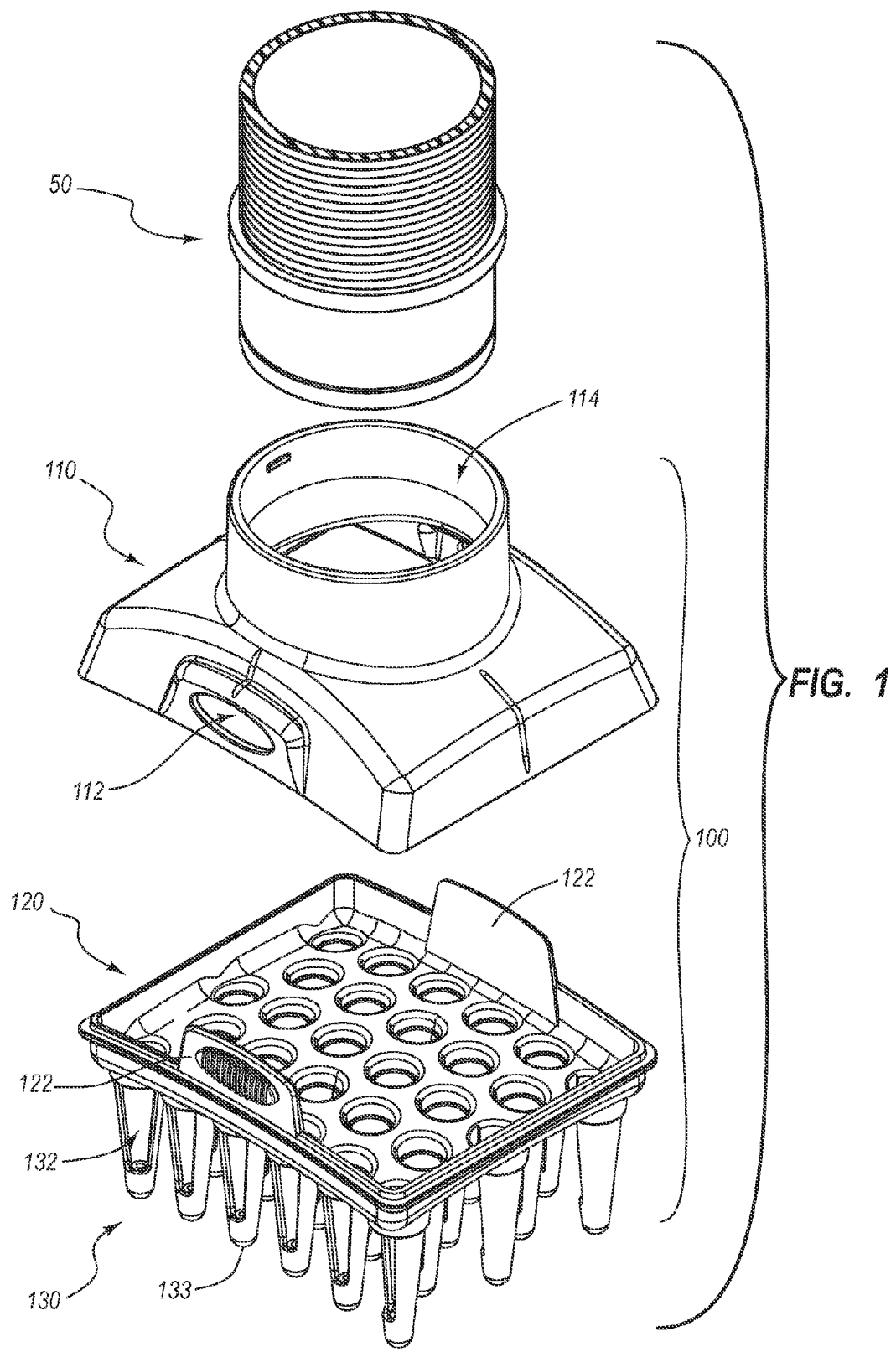
FIG. 1 is an exploded perspective view of one embodiment of an airflow applicator system.

In the following description, numerous specific details are provided for a thorough understanding of specific preferred embodiments. However, those skilled in the art will recognize that the invention can be practiced without one or more of the specific details, or with other methods, components, structures, etc.

In some cases, well-known structures, details, or operations are not shown or described in detail in order to avoid obscuring aspects of the preferred embodiments. Furthermore, the described features, structures, or characteristics may be combined in any suitable manner in one or more embodiments.

Disclosed are embodiments of airflow applicator pieces used for delivering directional, heated air to the scalp and hair of humans and/or animals to be used for eliminating ectoparasites, such as lice and lice eggs, for example, from a patient or animal. In preferred embodiments, the device will be configured to deliver heated airflow (from a separate device, or from another portion of a single device, that generates heated airflow) efficiently right to where lice and eggs most frequently reside. Also disclosed are preferred treatment methods for delivering heated airflows for use in eliminating lice and lice eggs on an animal, such as on a human scalp.

Some embodiments of airflow applicators may be configured to facilitate lifting and separation of hair. This may be accomplished, in some embodiments, by providing a device with a plurality of generally tubular and elongated elements (e.g., fingers) with openings (discharge ports) formed in one or more of the elongated elements. The airflow may pass through the openings in the elongated elements. The openings may also be configured to direct the airflow in particular ways or directions to maximize the opportunities for eliminating lice and/or eggs. In some embodiments, the elongated elements may be positioned in a staggered array.

In some preferred embodiments, the applicator may be configured such that the airflow is delivered laterally of the applicator such that the treatment site extends from the position of the applicator to substantially only one side of the applicator. In other words, the airflow may be generally directed in a particular direction (two-dimensionally; e.g., when viewing the applicator in a plan view above the treatment site, the airflow substantially extends in only one of four primary directions, each of which is either orthogonal or opposite from the other three). In some such embodiments, the airflow may be delivered laterally of the applicator (when viewed from overhead the applicator on the treatment site) such that the treatment site extends from the applicator to only one side of the applicator. In this manner, a user may be able to more easily visualize a treatment area and move the applicator through a desired treatment pattern on the skin of an animal, such as the scalp of a human patient, to complete a full treatment of the area infested with lice or other ectoparasites. Of course, the applicator may be configured to direct airflow in multiple directions in another dimension. For example, when viewed from the side, some embodiments may provide for an airflow along an angular swath that allows the airflow to directly impinge on a patient's skin, and also be directed towards a patient's hair at multiple angles so as to minimize the chances for lice and/or lice eggs to be missed or otherwise survive. In certain preferred embodiments, the airflow may be initially delivered towards the scalp, and then redirected laterally of the applicator, such as via ported fingers, as will be discussed in greater detail below.

In one example of a method for treating an animal having a lice infestation to substantially eliminate both lice and lice eggs from the animal, an applicator may be provided. It should be understood that lice (or other ectoparasites) and their eggs may be "eliminated" by killing them, removing them from the animal, or rendering them no longer viable or capable of sustained life following treatment according to aspects of the present invention. In some implementations, at least a portion of the applicator may be disposable. Preferably, the applicator is configured for delivering airflow to a treatment site on the animal. The applicator may be connected to an airflow supply. In some embodiments, the airflow supply may comprise a high-volume blower. Depending upon the design of the applicator, standard hair blowers may be unable to generate a sufficient volume of airflow to perform an effective treatment. As such, "high-volume blowers," as this term is used herein, refer to blowers capable of delivering between 45 and 200 cfm (cubic feet per minute) of airflow. However, other airflow rates are also contemplated, and the efficacy of particular airflow rates may depend on the design of the applicator. For example, if the right applicator design and/or treatment methodology is used, much lower airflow rates may be viable, including but not limited to those around 20-45 cfm. More information regarding preferred airflow rates and heat ranges can be found in U.S. Patent Application Publication No. 2006/0130393 titled "Ectoparasite eradication method and device," which is hereby incorporated by reference in its entirety.

A heated airflow may then be delivered through the applicator to the treatment site to substantially eliminate the lice and lice eggs from the treatment site, after which the applicator may be moved to a second treatment site. The treatment may then be repeated at the second treatment site. The delivering and moving steps may be repeated as desired until substantially all lice and lice eggs have been eliminated from the animal. In some implementations, the treatment at each treatment site is performed for at least thirty seconds. In some implementations, at least a portion of each treatment site overlaps with a portion of each subsequent (and/or previous) treatment site. In some such implementations, at least one-fourth of each treatment site overlaps with each subsequent and/or previous treatment site. In other such implementations, at least one-half of each treatment site overlaps with each subsequent and/or previous treatment site.

In embodiments having a disposable portion, the disposable portion of the applicator (or the entire applicator) may be removed from the blower and discarded. A new applicator may then be used in a subsequent treatment session on a new patient.

In some embodiments, the applicator may include an applicator tip and an applicator body (also equivalently referred to herein as an applicator "base"), wherein the applicator tip is configured to be detachably coupled to the applicator body. The "applicator tip" may comprise that portion or portions of the applicator that are intended to contact the patient or their hair (or, in the case where the device is being used on non-human animals, the terms "scalp" and "hair" can be replaced with the terms skin or hide and fur or feathers, as those terms may apply). The applicator tip may be configured to be coupled with the blower. For example, the applicator may comprise a cylindrical opening configured to be coupled to a hose of a blower. The cylindrical opening may be configured to allow the applicator to be rotated on the hose, which allows a user to rotate the applicator as desired during a treatment session. In some embodiments, the applicator may be lockable at a particular rotational position. In some embodiments, the cylindrical opening may be threaded to provide for a threaded connection with a blower hose.

In embodiments having a base and a tip, the base and the tip may be integrally or permanently connected. Alternatively, the base may be removably connected with the tip. A variety of means for removably connecting the base and the tip may be employed. In some embodiments, the means for removably connecting the base and the tip may comprise a tab and a corresponding tab recess, wherein the tab is configured to be received in the tab recess to couple the applicator tip to the applicator base. The tab may be positioned on the applicator tip and the tab recess may be positioned on the applicator base or the tab may be positioned on the applicator base and the tab recess may be positioned on the applicator tip. In some embodiments, the tab and tab recess may be configured to provide for a snap-fit connection.

One or both of the base and the tip may be disposable. Disposability of at least a portion of the device that is to come in closest contact to a patient's skin may be desirable to avoid spreading disease, infestations, human tissue, and/or ectoparasite remnants from one patient to the next. For example, in embodiments in which the tip is removable from the base, the tip may be disposable and configured for a single treatment session, whereas the base may be reused in multiple treatment sessions. In some embodiments, the applicator may be configured to deter a user from using at least a portion of the applicator for more than one treatment session or may be configured to provide an indication that the applicator (or a disposable portion of the applicator) has already been used in a treatment session. For example, in some embodiments, the applicator tip (or the entire applicator) may be configured to provide for a mechanical or thermal failure after the first use. As an example of a mechanical failure feature, in embodiments having an applicator tip, a portion of the applicator tip that is configured to facilitate coupling the tip with a base component, such as a tab or slot, may be configured to permanently break once the tip is removed from the base to deter the tip from being reused. As an example of a thermal failure feature to deter reuse, one or more components may be configured to decompose, shrink, warp, or have a thermal memory that renders the part unusable or un-attachable after a certain thermal dose that would typically be delivered during the course of a treatment session.

Alternatively, one or more components or portions of the device may be configured to provide for discoloration after a certain period of time during use to provide for a visual indication that the component has already been used to treat a patient. For example, the material used to make up one or more pieces of the device may be configured to change colors after being exposed to the heat associated with the heated airflows during treatment. As another alternative, pre-paid treatment cards, electronic counters, smart chips, and/or time-based lockouts within the system electronics and/or applicator may be used to provide an indication of prior uses.

As still another alternative, one or more components of the device may be configured to chemically and/or physically decompose during an attempted cleaning or continued use. For example, one or more components of the device may be configured to decompose when exposed to alcohol or another cleaning/disinfecting agent. As another example, one or more components of the device may be configured to decompose or change in composition as a result of normal ambient humidity after a certain amount of time. Such embodiments may be stored in special packaging to prevent inadvertent decomposition or change prior to being exposed to ambient humidity.

In some embodiments, the applicator may comprise a plurality of elongated fingers. In some embodiments, the elongated fingers may have a conical shape. At least a subset of the plurality of elongated fingers may comprise ports for delivering the airflow. In one preferred embodiment, the ports may extend along the majority of the length of the elongated fingers. In some embodiments, the ports may extend substantially the entire length of the elongated fingers. In some embodiments, substantially all of the ports may open on the same side of the fingers such that the applicator tip delivers substantially all of the airflow laterally of the applicator on only a delivery side of the applicator. In some embodiments, a cross-section of the applicator tip may comprise four sides, wherein one of the four sides comprises the delivery side, and wherein the ports are configured such that airflow is substantially directed towards only the delivery side of the four sides. Such a configuration may facilitate visualization and execution of a desired treatment pattern and/or improve the efficiency or pattern of the airflow delivery and the efficacy of the treatment.

The elongated fingers may comprise tips. The tips of the elongated fingers may be plugged or substantially solid. Such a configuration may help to minimize or prevent the potential for burns and/or thermal discomfort. The fingers may also be made up of a material having a low thermal conductivity to further avoid burns and/or thermal irritation. The ports may also be configured such that, during use, when the elongated fingers are positioned in contact with the skin of an animal, a substantial portion of the airflow is directed at an angle towards the skin and lower portions of hair shafts, where lice and lice eggs are most frequently located. A substantial portion of the airflow may also be directed parallel to or, in some embodiments, away from the skin to cause other portions of the patient's hair to also be directly impinged by the airflow.

In some embodiments, a subset of the elongated fingers may comprise ports that are angled inwardly towards one another. For example, in some embodiments, each of the elongated fingers positioned along two opposing sides of the applicator tip may be angled inwardly towards one another. Such a configuration may increase the concentration of airflow to a target treatment area on a patient for improved airflow efficiency or treatment efficacy or to, for example, minimize airflow that could hit a patient's eyes or ears or otherwise cause discomfort.

As set forth above, in some embodiments, the device may be configured as a two-piece design integrating a disposable tip. Alternatively, a one-piece re-usable design may be provided. In the latter embodiments, the piece may be cleaned and/or disinfected between uses. As still another alternative, a one-piece disposable design may be provided.

The discharge ports in one or more embodiments on the fingers may be designed to permit a telescopic shut-off in the molding tool to permit easier manufacturing and avoid side action-style molding. The discharge ports and other surfaces within the airflow path may be rounded or otherwise designed to avoid sharp edges or other physical geometries that might cause increased noise or whistling during use, or snagging of the patient's hair during repositioning of the applicator. Similarly, the tips of the fingers may be designed with smooth surfaces so as to avoid patient discomfort.

Tick marks or other visual indicators may also be placed on one or more of the outside edges of the device to facilitate repeatable placement and location of the applicator during treatment, especially when following a particular treatment pattern.

An embodiment of an applicator having a detachable or removable portion could be used by removing the detachable portion of the applicator for cleaning and re-use. Alternatively, the detachable applicator tip could be disposed of properly as a single-use component.

To facilitate connecting and disconnecting a removable applicator tip, some embodiments may incorporate one or more snap buttons that help orient and removably lock the parts of the applicator together. Other means for releasably connecting two applicator pieces may include, but are not limited to, hinges, snap rings, tongue-and-groove elements, detents, clasps, or other releasable connecting means known to those skilled in the art. Portions of the connecting features and/or the mating surfaces may also include design elements to enhance sealing the parts from airflow loss.

In other embodiments, it may be preferred to embody the main design features in a single, essentially unibody component. Such a design can provide good durability, for example. A one-piece design may also have good potential to be cleaned and re-used if that is desired, thereby offering the possibility of reduced cost when considered on a per-treatment basis and compared to a two-piece design with a disposable tip.

In some embodiments, the discharge ports may be configured to direct airflow in a primary pattern that exits the applicator in a defined (and substantially unidirectional) way that can be selectively oriented by the user (e.g., by rotating the applicator and/or one or more elements on the applicator). As discussed above, this may be accomplished by providing the airflow ports in the fingers all on substantially the same side of the fingers, as shown in the drawings accompanying this disclosure, the embodiments of which will be described in greater detail below. Other discharge directionality (including not substantially unidirectional) may prove advantageous for other treatment conditions or options.

Orienting the discharge ports can help to increase the concentration and velocity of airflow and heat to a selected area of treatment. It can also be beneficial when combined with certain patterns of treatment, such as when a specific progression of airflow and heat or heat latency might be desired. For thick, dense, or curly hair, concentrated airflow can be helpful to ensure the airflow sufficiently penetrates the hair and minimizes the insulating effect of hair to achieve the desired effect.

Directional air delivery can also be beneficial in helping to avoid the delivery of heated airflow onto or around potentially sensitive areas of the patient, such as the eyes or ears. The directional flow can also help to lift and separate hair, and it can help minimize the amount of inefficient or "wasted" airflow that is not effectively delivered to the desired treatment site. Preferably, the device is configured to deliver airflow at the level(s) of the lice and their eggs. Since lice tend to feed on and concentrate near the scalp of a human patient and on the lower portions of hair at or near the roots of the hair, preferred embodiments direct airflow towards the scalp and lower portions of the hair shafts. However, as discussed elsewhere, since lice can also be found on other portions of hair shafts, it may also be preferred that airflow be simultaneously directed toward other portions of the hair shafts.

In a preferred embodiment, the applicator device is configured to deliver the airflow from multiple directions simultaneously. In other words, the heated airflow is delivered in a way that causes it to impinge upon the hair and scalp, and lice and eggs thereon, from multiple directions simultaneously. This has been found to be effective to help separate and break up clumps of hair in which lice could potentially hide and thereby avoid the effects of the airflow. It also helps to ensure that the lice and eggs are impinged by the air.

The size and shape of the applicator design can be modified to accommodate different desired treatment areas. Larger treatment areas might be desired, for example, when treating large animals or individuals with large heads, while smaller treatment areas might be desired such as for children with very small heads. A treatment area is usually defined in terms of that area of the delivery target that receives the greatest and most direct airflow, such as under and/or to the delivery side of the applicator in some embodiments. For purposes of illustration only, in one preferred embodiment, the applicator tip is approximately 2.5×3.3 inches. In one particular embodiment, the spacing between the tips of the fingers in the array is about 0.7 inches. In one particular embodiment, the length of the fingers is 1.5 inches each (although it should be understood that not all tips need have the same length, so as to accommodate the curvature of the scalp). In one particular embodiment, the ports in the fingers begin about 0.35 inches from the end of the fingers.

Some embodiments may also include an applicator or applicator tip having a generally concave base curve in one or more cross-sectional planes. This feature may help to avoid gapping between the fingers and the scalp and keep the applicator tips in close contact to the scalp for patients of varying head shapes and diameters, and may also provide greater comfort to the patient. Furthermore, a biconcave base curve may be employed to achieve spherical or semispherical extension of the tips to more accurately follow the curvature of the patient's scalp. Alternatively, the applicator tip or features thereof could incorporate some flexibility (such as an elastomeric material) or movable/reconfigurable design elements (such as spring loaded fingers) to help attain conformity with varying radii of patients' scalps.

Figure 2:
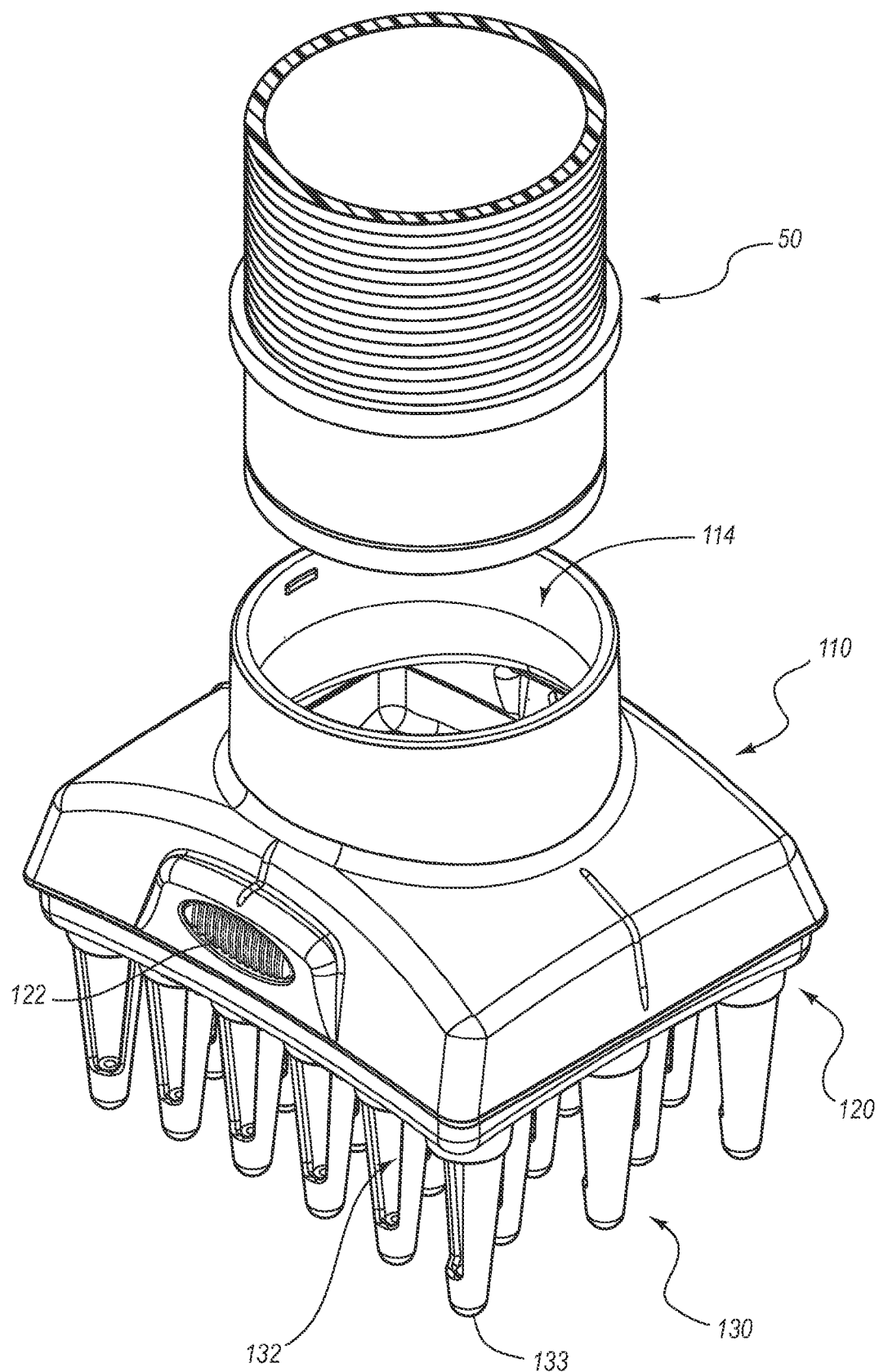
FIG. 2 is another perspective view of the airflow applicator system of FIG. 1.

Specific exemplary embodiments will now be described in greater detail with reference to the accompanying drawings. FIG. 1 depicts an embodiment of an airflow applicator 100. Airflow applicator 100 includes applicator base 110 and applicator tip 120. Applicator base 110 and applicator tip 120 may be configured to be coupled to one another. In the depicted embodiment, tip 120 includes opposing tabs 122 that are configured to be received in opposing tab recesses 112 formed within applicator base 110 to couple the base 110 with the tip 120, as shown in FIG. 2. Tabs 122 may be configured to flex so as to allow for a snap-fit connection between base 110 and tip 120. Of course, it should be understood that the tabs may instead be on the base, and the recesses on the tip, if so desired. It should also be understood that a variety of alternative means for coupling the base with the tip may be provided, as those having ordinary skill in the art will appreciate.

Figure 3:
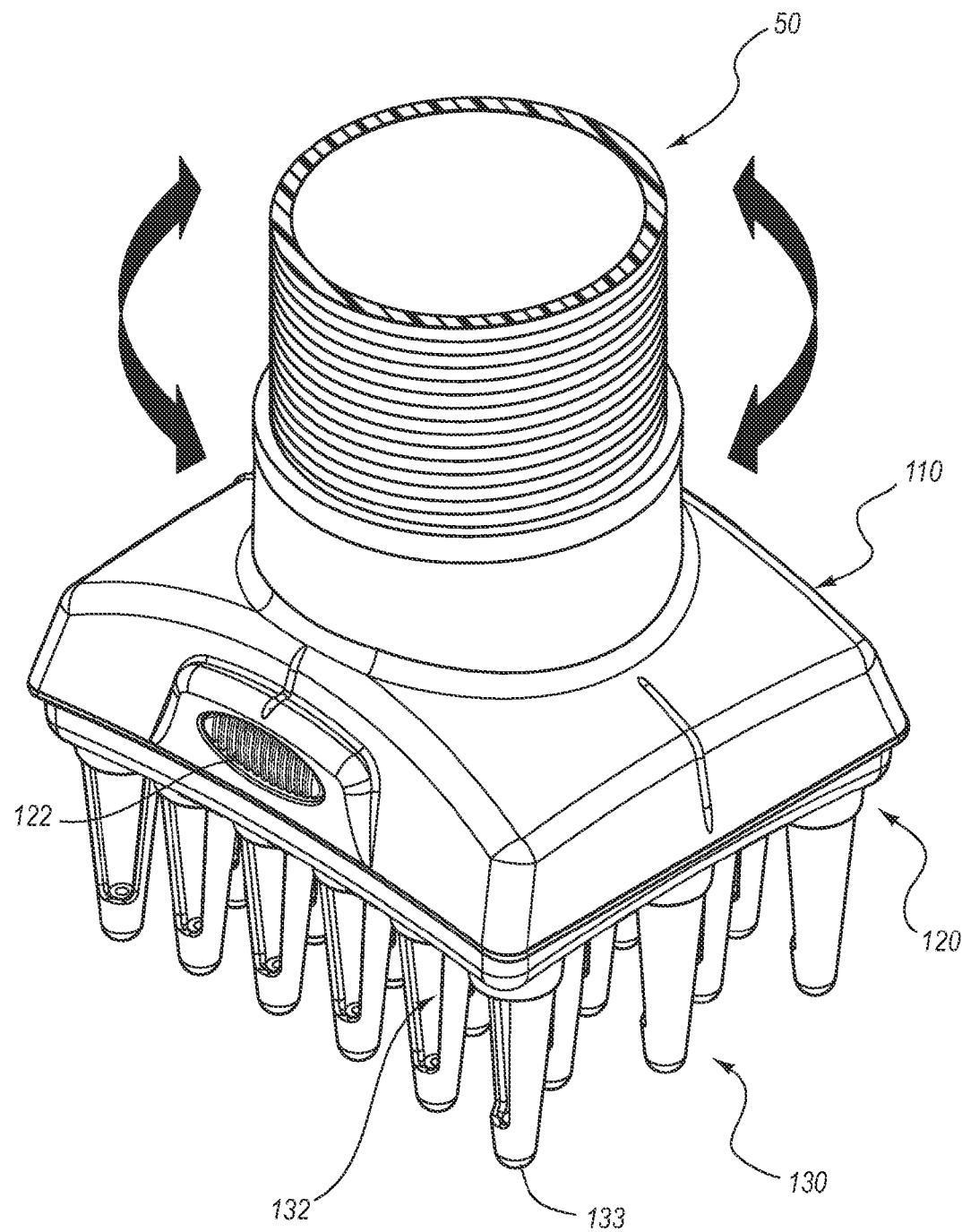
FIG. 3 is another perspective view of the airflow applicator system of FIGS. 1-2.

Base 110 has a cylindrical opening 114 that is configured to be coupled to a hose 50 of an airflow supply (not shown). In some implementations, the airflow supply may be a high-volume blower. A variety of means for coupling the base to the blower, such as to a hose of the blower, may be used. However, in a preferred embodiment, the cylindrical opening 114 is rotatably connected with hose 50. In such embodiments, the applicator may be rotated with respect to the hose 50 by rotating the base 110 with respect to the hose 50, as shown in FIG. 3. Alternative means of attachment include, but are not limited to, a quarter-turn fastener, a bayonet-style fastener, a taper-fit fastener, an annular snap-groove configuration, and the like.

Tip 120 may also include a plurality of elongated fingers 130. Each of the fingers 130 includes a port 132 that is configured to direct heated airflow from blower in a specific, desired manner. As seen in FIG. 1, the fingers 130 of tip 120 are arranged in an array of five rows of fingers. Since preferably the fingers 130 are to be placed in contact with the skin of a patient during a treatment session, the tips 133 of fingers 130 are substantially solid so as to provide an insulated barrier with the patient's skin. It may therefore be desirable to construct the tips of a material having a low thermal conductivity.

The design of applicator tip 120 may be advantageous for certain implementations because it may be more generally useful for treatment irrespective of a patient's hair type. For example, for patients with thick, curly hair where combs and comb-like devices are very difficult or at times impossible to use because they can't be easily pulled or pushed through the hair, the design of tip 120, as well as other similar designs lacking comb-like structures, may function well with all types of hair lengths, curliness, thicknesses and styles.

Figure 4:
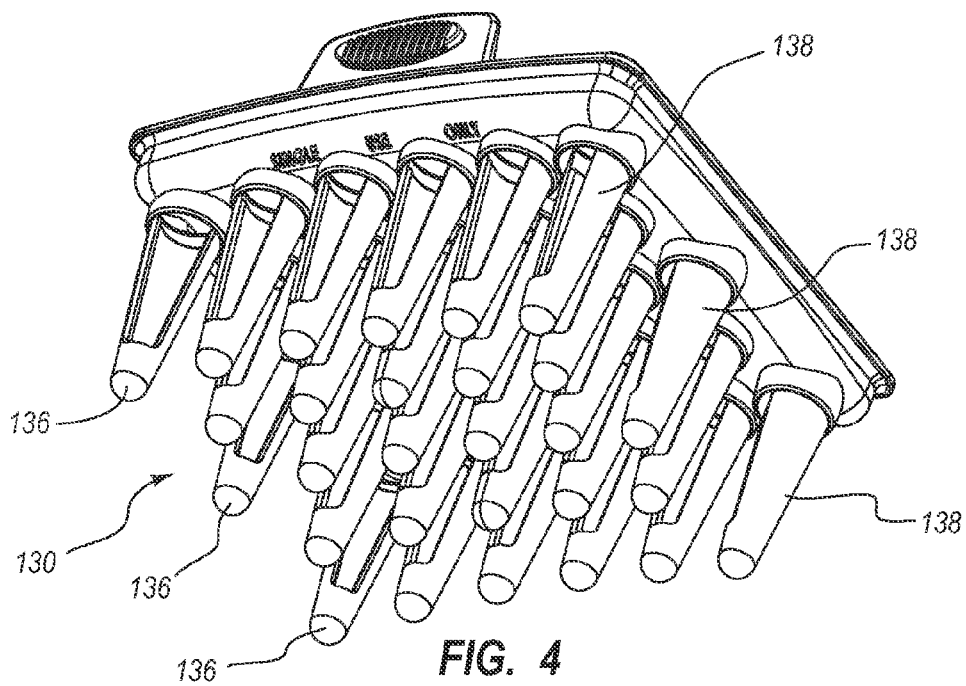
FIG. 4 is a perspective view of the applicator tip of the airflow applicator system of FIGS. 1-3.
Figure 5:
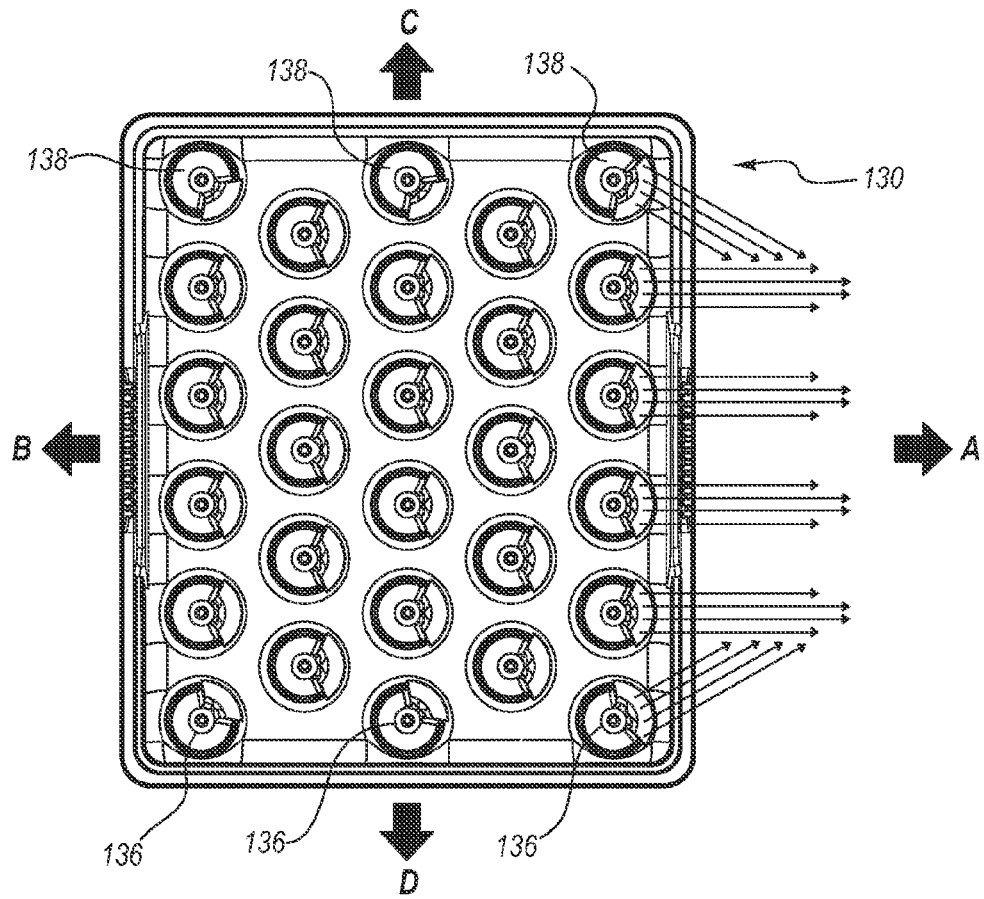
FIG. 5 is a top plan view of the applicator tip of FIG. 4.

As best seen in FIGS. 4 and 5, each of the ports 132 open towards substantially the same direction such that the applicator tip 120 delivers substantially all of the airflow to a single side of the applicator. In other words, as shown in FIG. 5, substantially all of the airflow is directed in direction "A" from the overhead perspective shown in this figure. It can also be seen that, substantially no airflow is directed towards the other three sides of the device. In other words, as shown in FIG. 5, no airflow is directed in any of directions "B," "C," and "D." Such a configuration may be useful to help a practitioner avoid directing airflow onto sensitive areas such as eyes or ears, or to visualize each of a plurality of treatment areas in a treatment pattern to more effectively treat a patient suffering from an infestation of lice or another ectoparasite. Additionally, such a configuration may reduce turbulence and high pressure zones within the treatment area, thereby increasing airflow volume and velocity, both of which are important for treatment effectiveness.

Although, as discussed above, it may be preferred to direct airflow laterally of the applicator and primarily to a single side of the applicator, it may also be desirable to configure a subset of the fingers such that the ports are angled relative to the ports of the other fingers. For example, as shown in FIGS. 4 and 5, the ports of fingers 136 are angled inwardly towards the ports of fingers 138. This angling of ports along opposing sides of the applicator tip 120 may be useful in concentrating airflow to a target area to further increase the effectiveness of a treatment session. This concentration of airflow can be visualized by referencing the arrows extending from ports 136 and ports 138 in FIG. 5.

Figure 6:
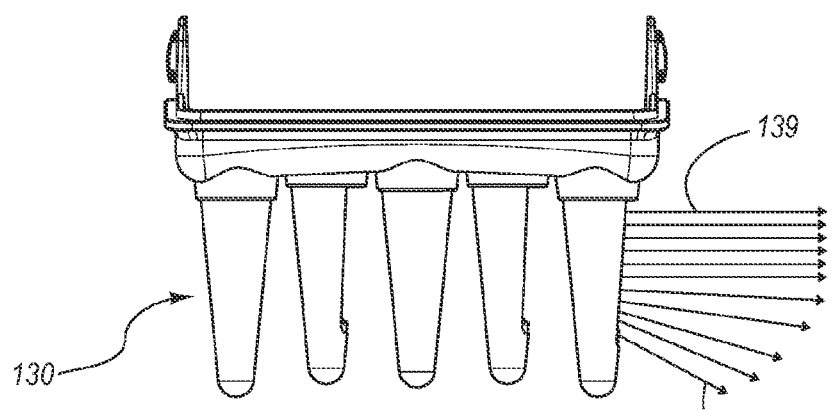
FIG. 6 is a side elevation view of the applicator tip of FIG. 4.
Figure 7:
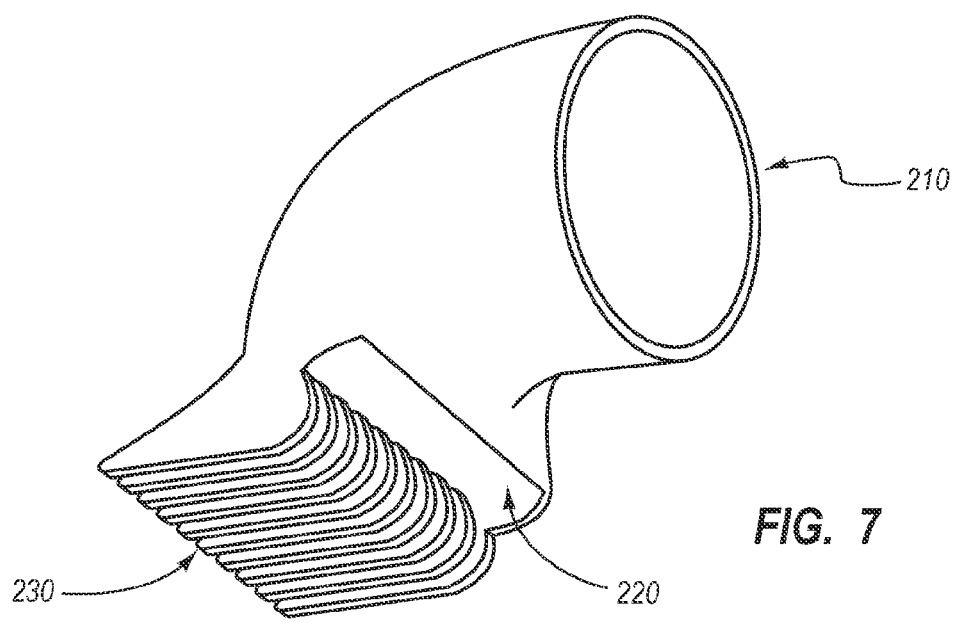
FIGS. 7-16 are perspective views of alternative embodiments of airflow applicators
Figure 8:
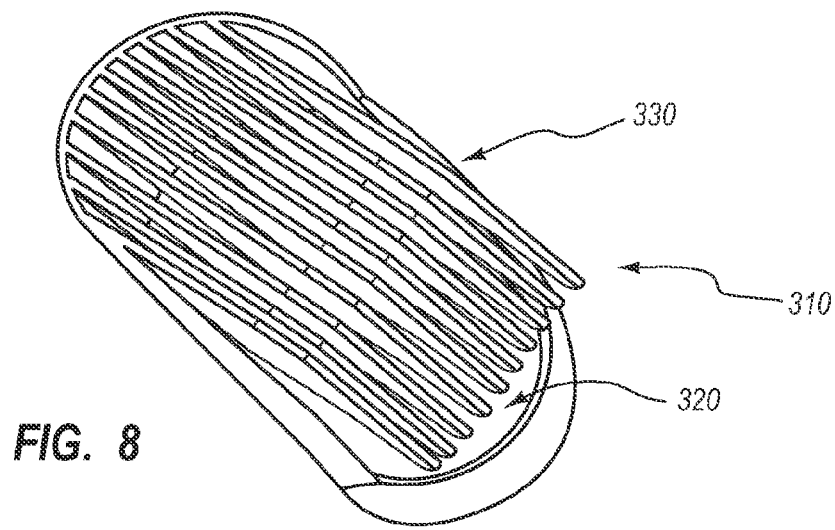
Figure 9:
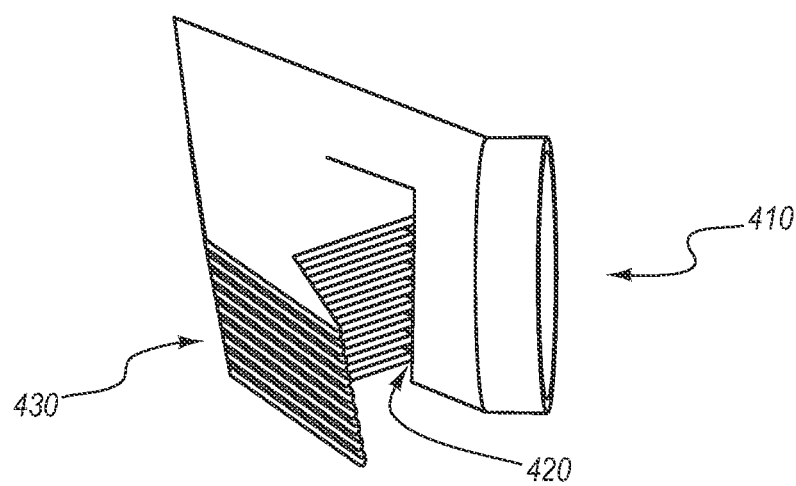
Figure 10:
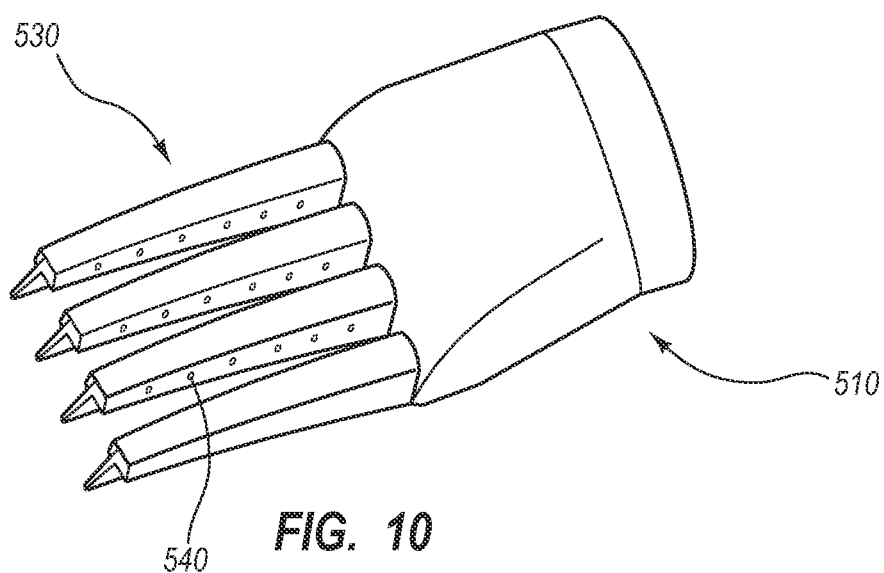
Figure 11:
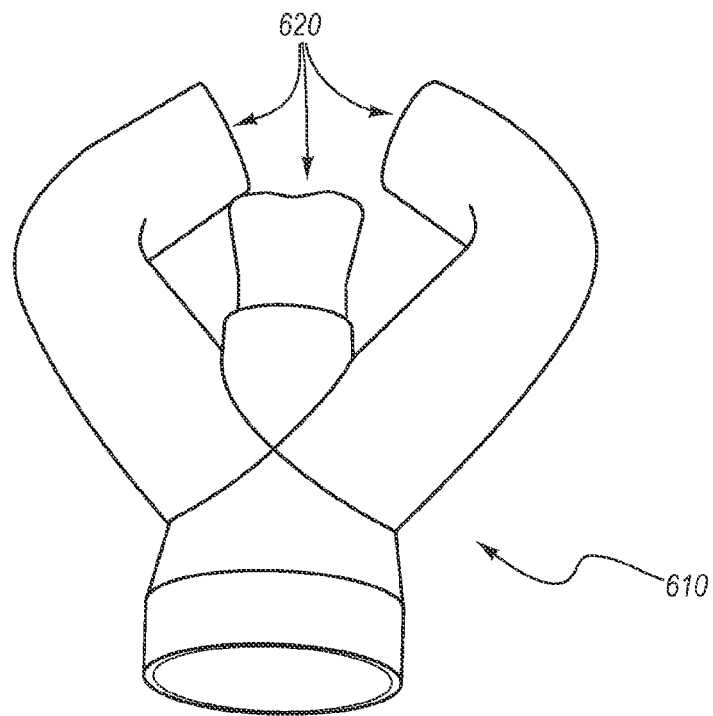
Figure 12:
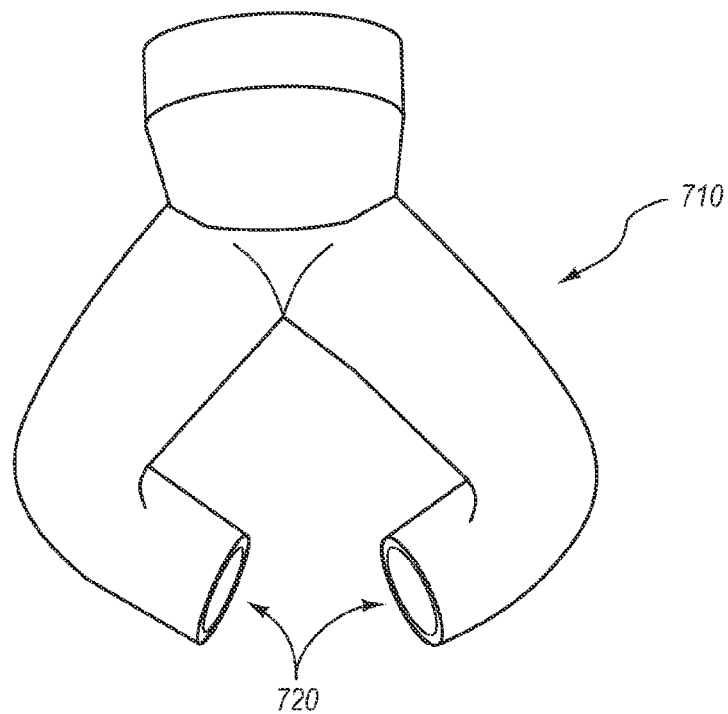
Figure 13:
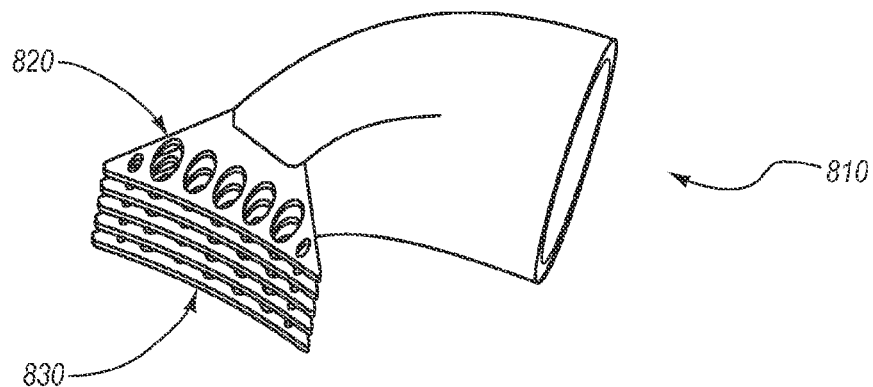

However, it should be understood that each of the ports 132 may be configured to direct airflow in multiple directions from another perspective. In fact, it may be preferable to configure the ports to specifically direct airflow both towards a patient's skin and parallel to a patient's skin, as shown in FIG. 6. Thus, as indicated by arrow 137, a substantial portion of the airflow is directed towards a patient's skin, such as towards a patient's scalp. In addition, as indicated by arrow 139, a substantial portion of the airflow is directed substantially parallel to the patient's skin. Thus, in the depicted embodiment, substantially no airflow is directed away from the patient's skin. Directing the airflow along a large angular swath, and from a variety of different angles, will help to ensure that any and all lice and eggs will be directly impinged by the airflow, regardless of whether the lice/eggs are located on a hair shaft or on the scalp. However, in other preferred embodiments, some airflow may also be directed away from the patient's skin. In other words, in such embodiments air may be directed towards the scalp, parallel to the scalp, and away from the scalp simultaneously.

A variety of alternative airflow applicators are shown in FIGS. 7-16. Applicator 210 has a port 220 that directs airflow directly towards a patient's scalp (or skin) and a plurality of comb elements 230 to assist in the lifting and separation of hair during treatment.

Applicator 310 has a port 320 that directs airflow laterally of a patient's scalp and a plurality of comb elements 330.

Applicator 410 has a port 420 that directs airflow laterally and directly downward toward a patient's scalp, along with a plurality of comb elements 430.

Applicator 510 has a plurality of elongated fingers 530, each of which have ports 540 that direct air in between the fingers 530, as well as lower ports (not shown) to direct airflow downward toward the scalp.

Applicator 610 includes three large ports 620 that are configured to direct airflow to a concentrated target area from multiple directions simultaneously.

Applicator 710 includes two large ports 720 that are configured to direct airflow to a concentrated target area from multiple directions simultaneously.

Applicator 810 includes a plurality of comb elements 830, each of which includes an array of ports 820 to direct airflow downward toward the scalp and in between and laterally of the comb elements 830.

Figure 14A:
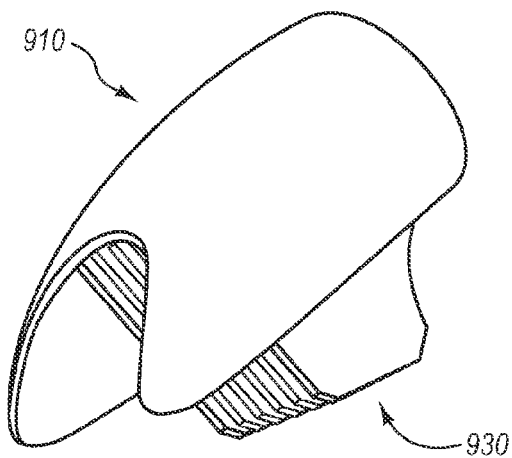
Figure 14B:
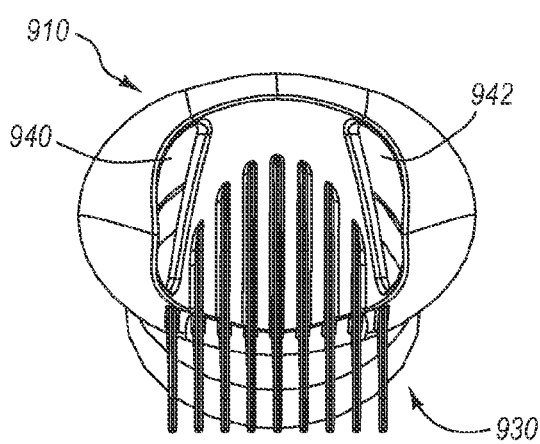
Figure 15:
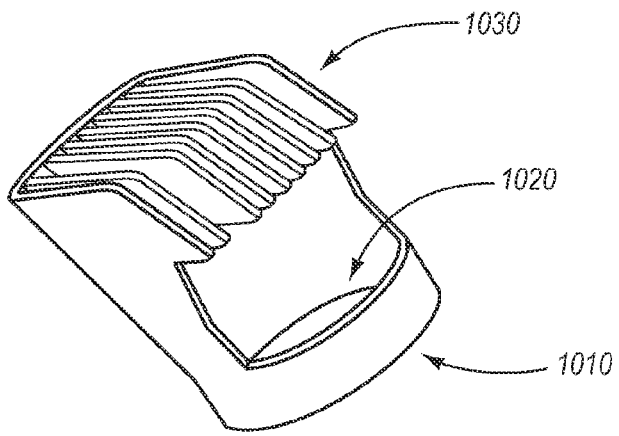
Figure 16:
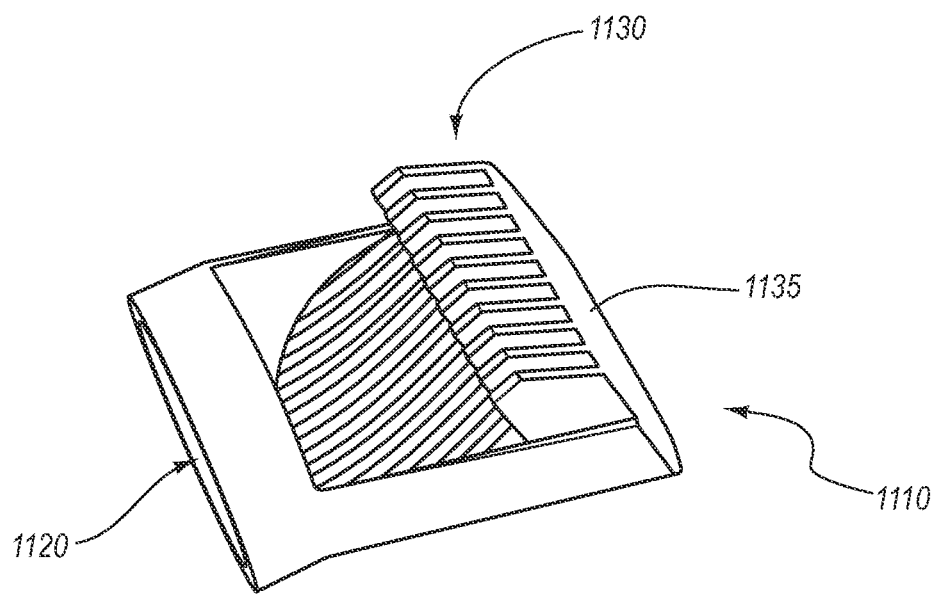

Applicator 910 includes two directional ports, illustrated at 940 and 942 in FIG. 14B, that are configured to divide the incoming airstream into two channels around a plurality of (optional) comb elements 930 and laterally of a patient's scalp from multiple directions simultaneously.

Applicator 1010 includes a port 1020 that is configured to direct airflow laterally of a patient's scalp and a plurality of comb elements 1030.

Applicator 1110 includes a plurality of comb elements 1130 and a plugged end 1135 such that airflow from port 1120 is redirected immediately adjacent to a patient's scalp.

Each of applicators 210, 310, 410, 810, 910, 1010, and 1110 include comb-like structures. Thus, each of applicators 510, 610, 710, and 910 (in its optional combless configuration) lack a comb-like structure. Applicators that lack a comb-like structure may be preferred for certain implementations because their efficacy and/or ease of use are less likely to depend upon the characteristics of the patient's hair and such embodiments are less likely to get caught in a patient's hair during treatment.

A preferred treatment pattern and methodology will now be discussed with reference to FIGS. 17A-17C. The preferred pattern shown in these Figures is preferably performed with an applicator in which the airflow is substantially directed in a single direction downward and laterally of the applicator, such as the applicator of FIGS. 1-6. In such applicators, the practitioner may perform a desired directional treatment pattern, such as the pattern of FIGS. 17A-17C. It should be understood, however, that the applicator may be positioned during the pattern such that the airflow is directed in a direction other than the direction of the pattern, as indicated by the pattern arrows in FIGS. 17A-17C. In other words, in one implementation of the pattern depicted in FIG. 17A, the airflow is directed up, or towards the front of the user, in each, or some, of the rows of the pattern. It should also be understood that a variety of alternative patterns will be apparent to those of ordinary skill in the art after having received the benefit of this disclosure. As just one example, the patterns shown in FIGS. 17A-17C may proceed in the opposite direction to and/or different order than that suggested by the figures.

Figure 17A:
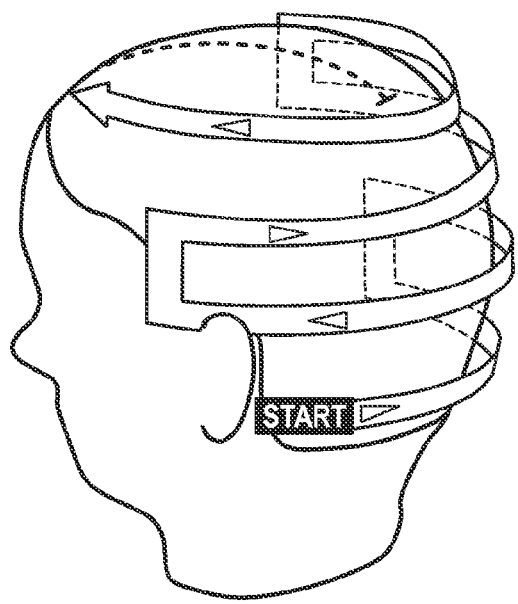
FIGS. 17A-17C illustrate an example of a preferred treatment pattern using an airflow applicator system.

As shown in FIG. 17A, the applicator may be initially placed along a patient's hairline just behind the ear. The pattern may then proceed across the bottom edge of the hairline, as shown in this figure. Preferably, the applicator is held in a plurality of positions along the bottom edge of the hairline for at least thirty seconds in each position. It is also preferable that each position in the pattern overlaps with one or more adjacent positions to ensure that all lice and eggs are eradicated. In some preferred implementations, each position in the pattern overlaps at least one-fourth of each previous position. In other implementations, each position in the pattern overlaps at least one-half of each previous position.

When the overlapping positions of the pattern have reached the hairline just behind the opposite ear of the patient, the pattern may then be moved up towards the top of the patient's head. The applicator may then be moved to the left along the second row from the bottom. As illustrated in FIG. 17A, this pattern of overlapping treatment positions may be moved back and forth across the patient's head in parallel rows until the forehead hairline is reached.

Figure 17B:
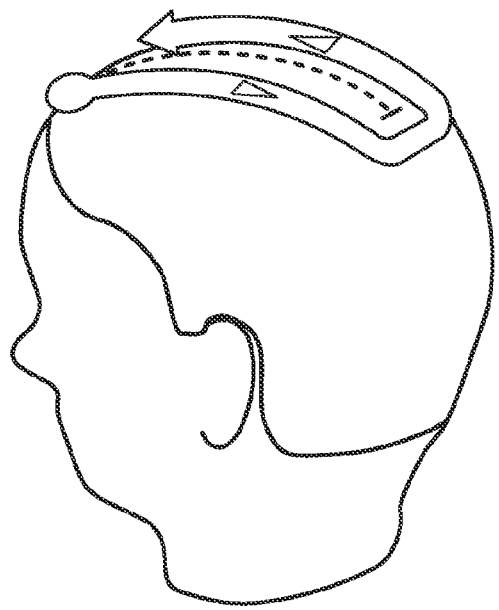

In preferred implementations, the treatment pattern may then proceed as shown in FIG. 17B. As illustrated in this figure, the applicator may begin adjacent to the midline of the patient's head and over the front hairline. Preferably, the applicator is positioned such that the airflow is directed across the midline to the opposite side of the head. The pattern may then proceed, largely as described above, in the horseshoe-shaped pattern of FIG. 17B.

Figure 17C:
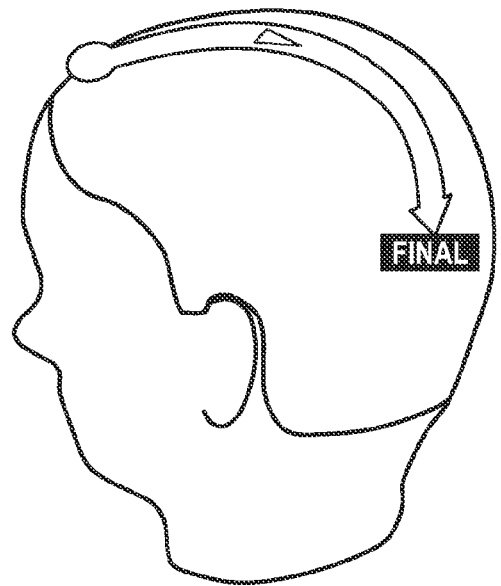

A final sub-pattern in the treatment pattern may then be performed, as illustrated in FIG. 17C. In this sub-pattern, the applicator is preferably initially positioned such that the airflow is directed away from the patient's face. The overlapping positioning and repositioning described above may then be performed in the straight line shown in the figure until the applicator is positioned just below the top or "crown" of the head. Preferably, the applicator is then rotated 180 degrees such that the airflow is directed upward, after which the pattern continues until the applicator is adjacent to the bottom hairline again.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. The scope of the present invention should, therefore, be determined only by the following claims.

The invention claimed is:

1. A method for treating an animal having a lice infestation to substantially eliminate both lice and lice eggs from the animal, the method comprising:
   obtaining an applicator, wherein at least a portion of the applicator is disposable, wherein the applicator comprises a plurality of elongated fingers, and wherein at least a subset of the plurality of elongated fingers comprise ports for delivering airflow, and wherein the applicator is configured for delivering heated airflow to a treatment site on the animal;
   connecting the applicator to a heated airflow source;
   delivering a heated airflow through the applicator to the treatment site to substantially eliminate the lice and lice eggs from the treatment site;
   moving the applicator to a second treatment site;
   delivering a heated airflow through the applicator to the second treatment site to substantially eliminate the lice and lice eggs from the second treatment site;
   repeating the delivering and moving steps until substantially all lice and lice eggs have been eliminated;
   removing at least a portion of the applicator from the heated airflow source;
   disposing of at least a portion of the applicator; and
   connecting a second applicator to the heated airflow source, wherein at least a portion of the second applicator is disposable, and wherein the second applicator is configured for delivering airflow to a treatment site on the animal.

2. The method of claim 1, wherein the applicator comprises an applicator tip and an applicator base, wherein the applicator tip is configured to be detachably coupled to the applicator base, and wherein the step of connecting the applicator to the heated airflow source comprises coupling the applicator base with the heated airflow source and coupling the applicator tip with the applicator base.

3. The method of claim 2, wherein the step of disposing of at least a portion of the applicator comprises disposing of the applicator tip.

4. The method of claim 1, wherein the animal comprises a human, wherein the treatment site is on the scalp of the human, and wherein the method further comprises repeating the delivering and moving steps until the entire scalp of the human has been part of at least one treatment site.

5. The method of claim 1, wherein the applicator lacks a comb-like structure.

6. The method of claim 1, wherein each of the ports open toward substantially the same direction such that the applicator tip delivers substantially all of the airflow to a single side of the applicator.

7. The method of claim 1, wherein at least a portion of the treatment site overlaps with at least a portion of the second treatment site.

8. The method of claim 1, wherein the heated airflow is delivered through the applicator to each of the treatment sites for at least thirty seconds.

9. The method of claim 1, wherein the applicator is configured to deter a user from using at least a portion of the applicator for more than one treatment session.

10. The method of claim 1, wherein at least a portion of the applicator is also part of the second applicator.

11. The method of claim 1, wherein the heated airflow source is configured to deliver a high-volume heated airflow.

12. A method for treating a human patient having a lice infestation to substantially eliminate both lice and lice eggs from the patient, the method comprising:

obtaining an applicator comprising a plurality of fingers, at least a subset of the plurality of fingers comprising ports, wherein the ports are positioned on the fingers along substantially only one side of the fingers, and wherein the ports are configured for delivering airflow to a treatment site on the scalp of the patient;

connecting the applicator to a blower;

contacting the scalp of the patient with the applicator at the treatment site;

delivering a heated airflow through the ports to the treatment site to substantially eliminate the lice and lice eggs from the treatment site, wherein the airflow is delivered laterally of the applicator such that the treatment site extends from the applicator to only one side of the applicator;

moving the applicator to a second treatment site;

contacting the scalp of the patient with the applicator at the second treatment site;

delivering a heated airflow through the applicator to the second treatment site to substantially eliminate the lice and lice eggs from the second treatment site, wherein the airflow is delivered substantially laterally of the applicator such that the second treatment site extends from the applicator to substantially only one side of the applicator;

repeating the delivering and moving steps until substantially all lice and lice eggs have been eliminated from the patient.

13. The method of claim 12, wherein the step of connecting the applicator to a blower comprises connecting the applicator to a hose of the blower.

14. The method of claim 12, wherein each of the plurality of fingers comprises a plugged tip.

15. The method of claim 14, wherein the step of contacting the scalp of the patient with the applicator comprises contacting the scalp of the patient with the plugged tips of the fingers.

16. The method of claim 12, wherein the applicator comprises an applicator tip and an applicator base, and wherein the applicator tip is configured to be detachably coupled to the applicator base.

17. The method of claim 12, further comprising disposing of at least a portion of the applicator.

18. The method of claim 17, wherein the step of disposing of at least a portion of the applicator comprises disposing of an applicator tip of the applicator.

19. The method of claim 18, further comprising connecting a second applicator tip to the heated airflow source, wherein the second applicator tip is disposable.

20. The method of claim 18, wherein the applicator is configured to deter a user from using the applicator tip for more than one treatment session.

* * * * *